US009874972B2

(12) United States Patent
Vandermeijden

(10) Patent No.: US 9,874,972 B2
(45) Date of Patent: Jan. 23, 2018

(54) SYSTEMS AND METHODS FOR DECOUPLING IMAGE GENERATION RATE FROM REPORTING RATE IN CAPACITIVE SENSING

(71) Applicant: Synaptics Incorporated, San Jose, CA (US)

(72) Inventor: Tom R. Vandermeijden, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 416 days.

(21) Appl. No.: 13/626,699

(22) Filed: Sep. 25, 2012

(65) Prior Publication Data

US 2014/0085249 A1    Mar. 27, 2014

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
USPC ................. 345/173, 174; 178/19.01–19.06
See application file for complete search history.

(56) References Cited

U.S. PATENT DOCUMENTS

| 6,043,810 A * | 3/2000 | Kim ......................... G06F 3/045 345/173 |
| 7,855,718 B2 * | 12/2010 | Westerman .................... 345/173 |
| 8,169,415 B2 * | 5/2012 | Shin et al. .................... 345/173 |
| 2005/0206625 A1 * | 9/2005 | Mattice et al. ............... 345/173 |
| 2008/0179112 A1 * | 7/2008 | Qin ..................... G06F 3/03547 178/18.06 |
| 2010/0217669 A1 * | 8/2010 | Gazdzinski ........ G06Q 30/0251 705/14.52 |
| 2012/0249475 A1 * | 10/2012 | Murphy et al. ............... 345/174 |
| 2012/0249476 A1 * | 10/2012 | Schwartz ................ G06F 3/044 345/174 |
| 2013/0194195 A1 * | 8/2013 | Parekh .................. G06F 3/0416 345/173 |
| 2014/0028577 A1 * | 1/2014 | Krah ....................... G06F 3/044 345/173 |

FOREIGN PATENT DOCUMENTS

WO    WO 2013110194 A1 *    8/2013

* cited by examiner

*Primary Examiner* — Kent Chang
*Assistant Examiner* — Jeffrey Steinberg
(74) *Attorney, Agent, or Firm* — Osha Liang LLP

(57) ABSTRACT

The embodiments described herein provide devices and methods that facilitate improved input device resistance to the effects of errors that may be caused by the motion of detected objects on such input devices, and in particular, to the effect of blurring and/or fragmenting. The devices and methods provide improved resistance to the effects of such errors by decoupling the image generating interval from the reporting interval. Specifically, the devices and methods enable the determination of the reporting rate independently of the period over which images of sensor values are generated. The devices and methods enable independent determination of the reporting rate by facilitating the setting of a second period, where images of sensor values are generated over a first period and the reporting interval is determined to include at least the sum of the first period and the second period.

13 Claims, 10 Drawing Sheets

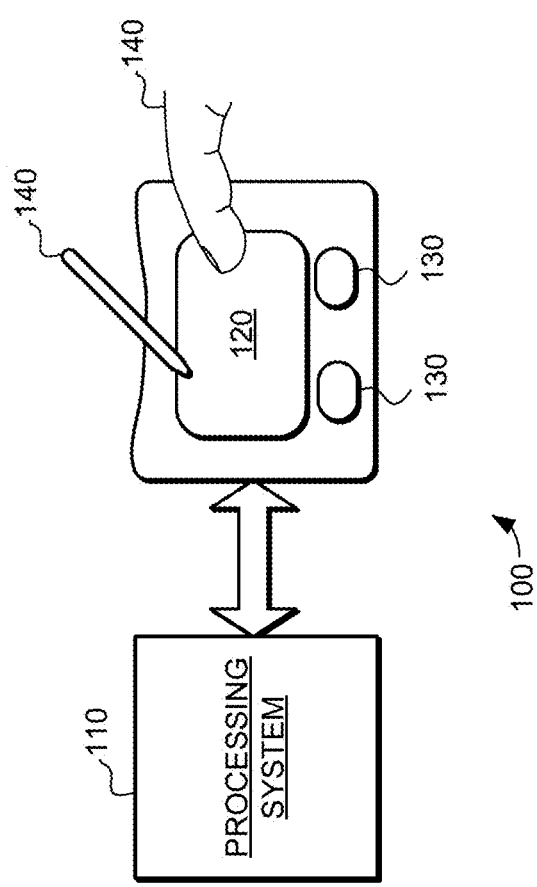

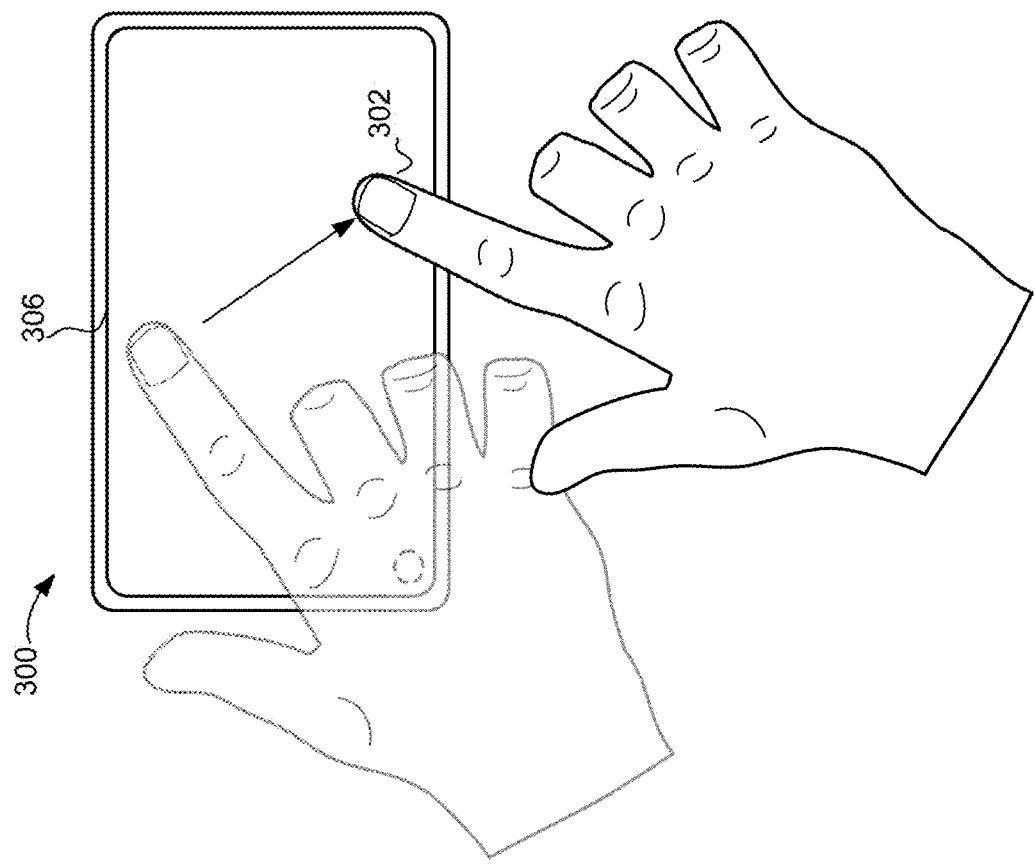

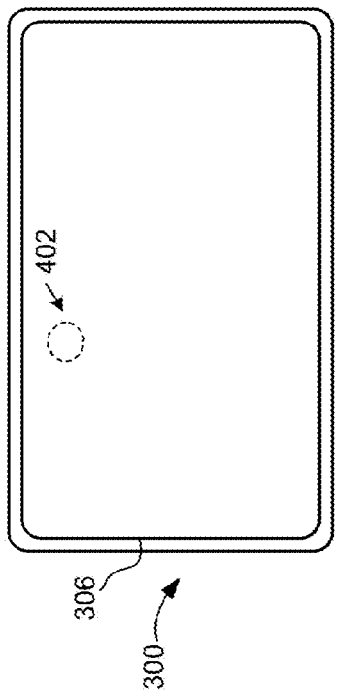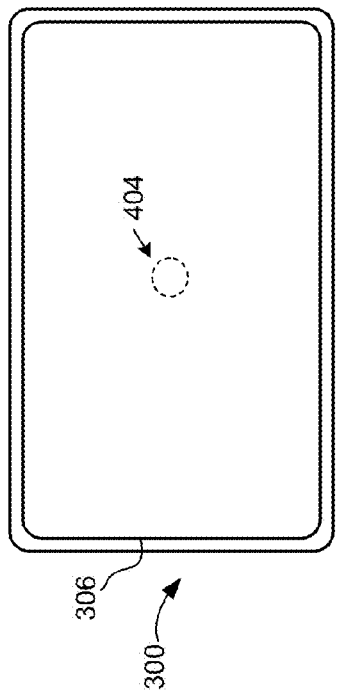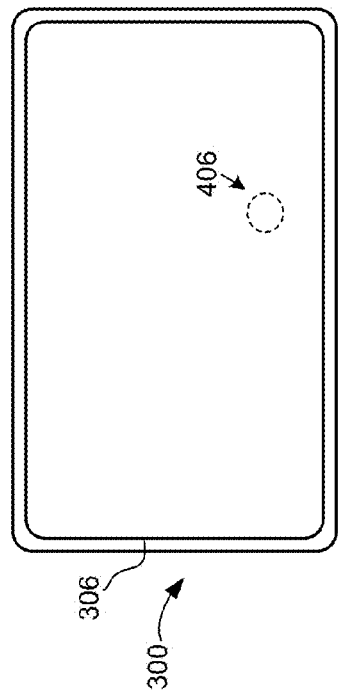

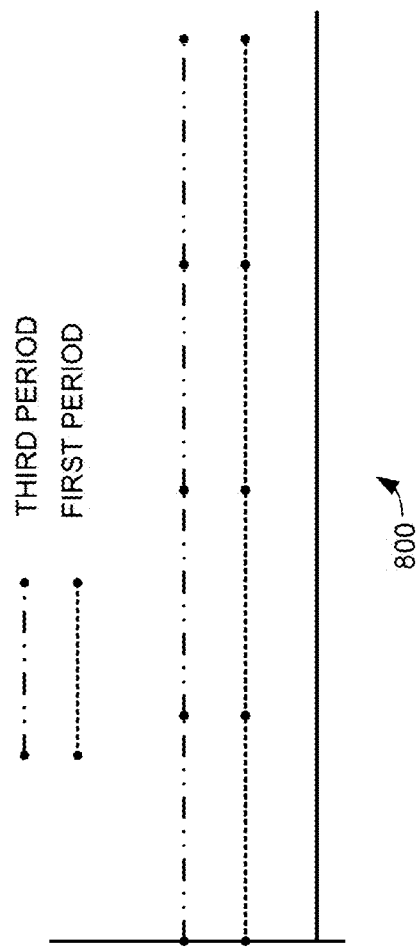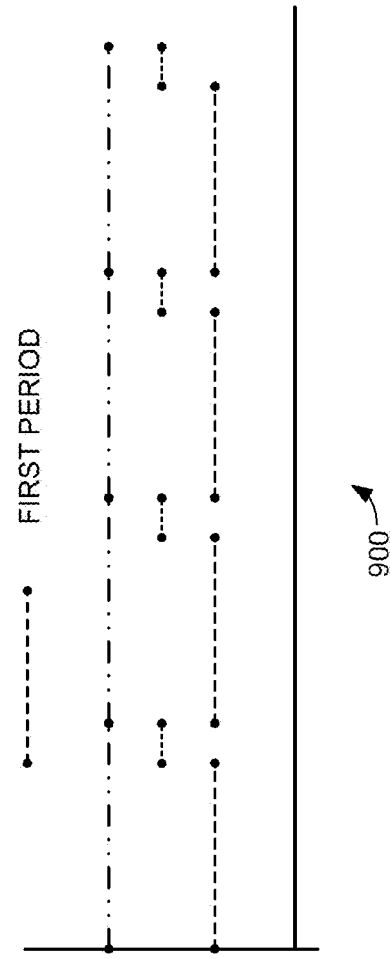

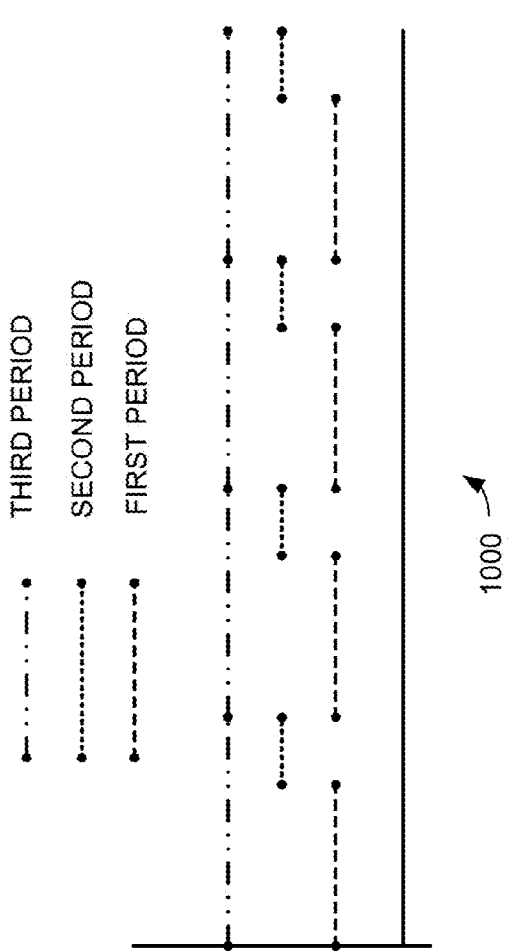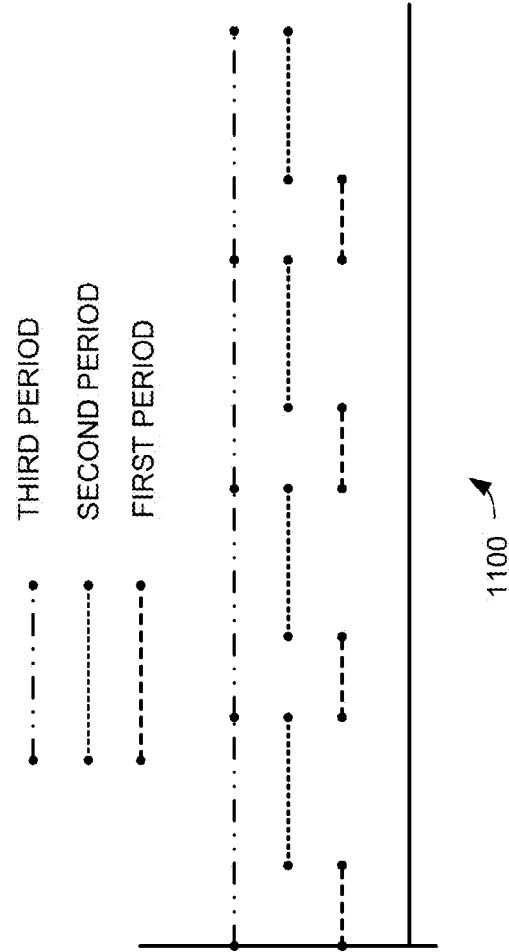

SYSTEMS AND METHODS FOR DECOUPLING IMAGE GENERATION RATE FROM REPORTING RATE IN CAPACITIVE SENSING

FIELD OF THE INVENTION

This invention generally relates to electronic devices, and more specifically relates to input devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers, or as transparent sensor devices integrated with display screens to provide a touch screen interface).

Many proximity sensor devices use capacitive techniques to sense input objects. Such proximity sensor devices may typically incorporate either profile capacitive sensors or capacitive image sensors. Capacitive profile sensors alternate between multiple axes (e.g., x and y), while capacitive image sensors scan multiple transmitter rows to produce a more detailed capacitive "image" of "pixels" associated with an input object. While capacitive image sensors are advantageous in a number of respects, they do share some potential disadvantages.

Specifically, some technologies used to create capacitive images can be sensitive to errors due caused by quickly moving input objects. For example, "blurring" and/or "fragmenting" errors may be generated in systems that use advanced signal processing techniques for generating capacitive images. In both cases the errors may make it difficult to accurately determine input object position and motion. In such situations the proximity sensor device can incorrectly interpret the presence and movement of such objects. Such errors can thus result in unwanted or missed user interface actions, and thus can frustrate the user and degrade the usability of the device.

Thus, while capacitive image proximity sensor devices are advantageous in a number of respects, there is a continuing need to improve the performance of such devices. For example, to improve the responsiveness of such sensors, or to improve the sensor's resistance to errors, such as blurring and fragmenting errors.

Other desirable features and characteristics will become apparent from the subsequent detailed description and the appended claims, taken in conjunction with the accompanying drawings and the foregoing technical field and background.

BRIEF SUMMARY OF THE INVENTION

The embodiments of the present invention provide devices and methods that facilitate improved input device performance. Specifically, the devices and methods provide improved resistance to the effects of errors that may be caused by the motion of detected objects on such input devices, and in particular, to the effect of blurring and/or fragmenting errors on input devices that use capacitive techniques to generate images of sensor values. The devices and methods provide improved resistance to the effects of such errors by decoupling the image generating interval from the reporting interval. Specifically, the devices and methods enable the determination of the reporting interval (and hence the reporting rate) independently of the period over which images of sensor values are generated. The devices and methods enable independent determination of the reporting interval by facilitating the setting of a second period, where images of sensor values are generated over a first period and the reporting interval is determined to include at least the sum of the first period and the second period. By enabling independent determination of the reporting interval the embodiments described herein facilitate the use of an image generating interval set to reduce errors caused by the motion of detected objects. This can provide improved accuracy of the input device, and thus can provide improved performance and usability of the input device.

In one embodiment, a processing system is provided for an input device having a plurality of sensor electrodes, where the processing system comprises a sensor module, a determination module, and a control module. The sensor module comprises sensor circuitry configured to operate the plurality of capacitive sensor electrodes to generate images of sensor values indicative of objects in a sensing region, where each of the images of sensor values is generated over a corresponding first period, with a second period between each first period. The determination module is configured to determine positional information using the images of sensor values and report the positional information to a host at a reporting interval determined by a third period, where the third period is defined to include at least the sum of the first period and the second period. The control module is configured to facilitate setting of the second period to determine the reporting interval. By facilitating the setting of the second period, the control module enables independent determination of the reporting interval (and hence the reporting rate) and thus facilitates the use of an image generating interval set to reduce errors caused by the motion of detected objects. This can provide improved accuracy of the input device, and thus can provide improved performance and usability of the input device.

BRIEF DESCRIPTION OF DRAWINGS

The preferred exemplary embodiment of the present invention will hereinafter be described in conjunction with the appended drawings, where like designations denote like elements, and:

FIG. 1 is a block diagram of an exemplary system that includes an input device in accordance with an embodiment of the invention;

FIG. 3 is a top view an exemplary input device in accordance with an embodiment of the invention;

FIGS. 4A-4C and 5A-5C are schematic views of an exemplary position information that can be determined for input objects moving in a sensing region;

FIGS. 7-11 are exemplary timing diagrams illustrating various embodiments of the invention.

DETAILED DESCRIPTION OF THE INVENTION

Figure 2A:
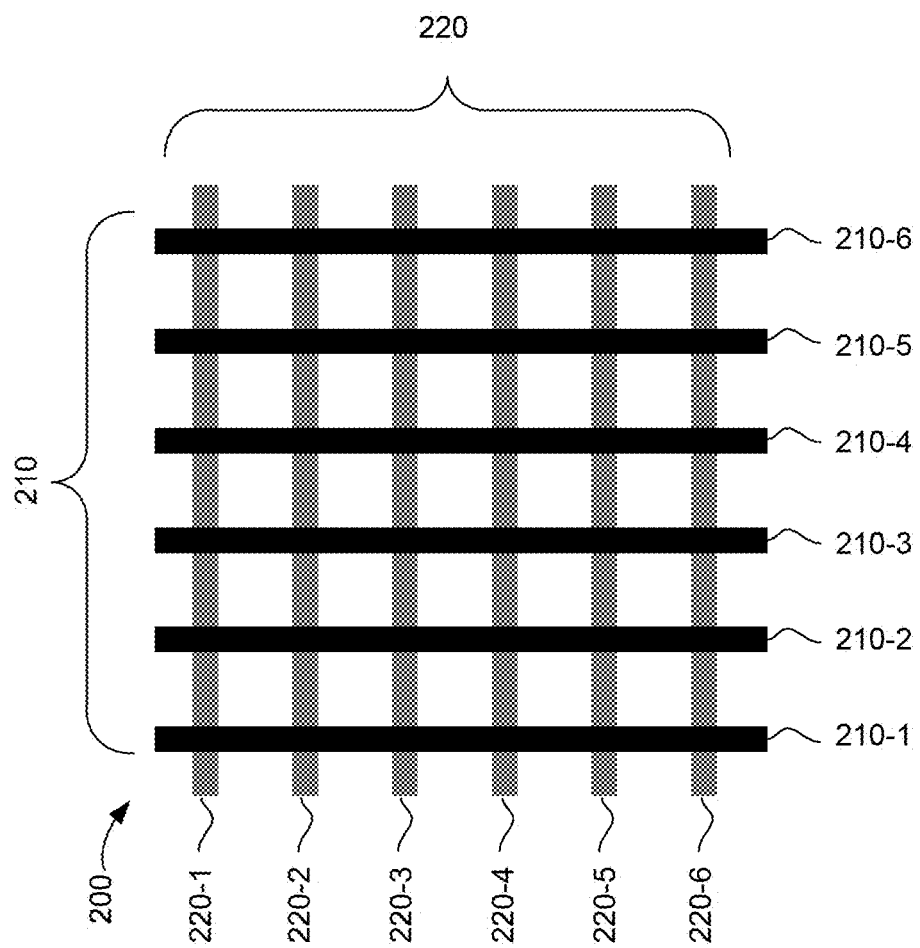
FIGS. 2A and 2B are block diagrams of sensor electrodes in accordance with exemplary embodiments of the invention.

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Various embodiments of the present invention provide input devices and methods that facilitate improved usability. FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include SMBus, $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 utilizes capacitive sensing to detect user input in the sensing region 120. To facilitate capacitive sensing, the input device 100 comprises one or more sensing electrodes for detecting user input (not shown in FIG. 1). Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "transcapacitive" sensing methods. Transcapacitive sensing methods, sometimes referred to as "mutual capacitance", are based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, one or more conductive input objects, and/or to one or more sources of environmental interference (e.g. other electromagnetic signals). Sensor electrodes may be dedicated transmitters or receivers, or may be configured to both transmit and receive.

In contrast, absolute capacitance sensing methods, sometimes referred to as "self capacitance", are based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground) to generate resulting signals on the sensor electrodes. In this case, the resulting signals received on a sensor electrode are generated by the modulation of that same sensor electrode. The resulting signals for absolute capacitive sensing thus comprise the effects of modulating the same sensor electrode, the effects of proximate conductive input objects, and the effects of and/or to one or more sources of environmental interference. Thus, by analyzing the resulting signals on the sensor electrodes the capacitive coupling between the sensor electrodes and input objects may be detected.

Notably, in transcapacitive sensing the resulting signals corresponding to each transmission of a transmitter signal are received on different sensor electrodes than the transmitter electrode used to transmit. In contrast, in absolute capacitive sensing each resulting signal is received on the same electrode that was modulated to generate that resulting signal.

In FIG. 1, processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, as described above, the processing system 110 may include the circuit components for operating the plurality of sensor electrodes to generate images of sensor values indicative of objects in a sensing region proximate to an input surface, and may also include circuit components to operate at least one force sensor to generate force values indicative of force applied to an input surface.

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) and a determination module. In accordance with the embodiments described herein a processing system is provided for an input device having a plurality of sensor electrodes, where the processing system comprises a sensor module, a determination module, and a control module. The sensor module comprises sensor circuitry configured to operate the plurality of capacitive sensor electrodes to generate images of sensor values indicative of objects in a sensing region, where each of the images of sensor values is generated over a corresponding first period, with a second period between each first period. The determination module is configured to determine positional information using the images of sensor values and report the positional information to a host at a reporting interval determined by a third period, where the third period is defined to include at least the sum of the first period and the second period. The control module is configured to facilitate setting of the second period to determine the reporting interval and thus determine the reporting rate. By facilitating the setting of the second period, the control module enables independent determination of the reporting interval and rate, and thus facilitates the use of an image generating interval set to reduce errors.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes a determination module configured to determine positional information for an input device based on the measurement.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In accordance with various embodiments of the invention, the input device 100 is configured with the processing system 110 coupled to a plurality of capacitive sensor electrodes.

In general, using the embodiments described herein the input device 100 is enabled to provide improved resistance to the effects of errors that may be caused by the motion of detected objects on such input devices, and in particular, to the effect of blurring and/or fragmenting errors on input devices that use capacitive techniques to generate images of sensor values. The input device 100 provides the improved resistance to the effects of such errors by decoupling the image generating interval from the reporting interval. To facilitate this input device 100 is configured to enable the determination of the reporting interval and the image generating interval independently. The input device 100 enables independent determination of the reporting interval and image generating interval by facilitating the setting of a second period, where images of sensor values are generated over a first period and the reporting interval is determined to include at least the sum of the first period and the second period. By enabling independent determination of the reporting interval the input device 100 facilitates the use of an image generating interval set to reduce errors caused by the motion of detected objects, while providing a reporting interval (and hence a reporting rate, as the reporting rate is the inverse of the reporting interval) that meets requirements of a host system. This can provide improved accuracy of the input device, and thus can provide improved performance and usability of the input device.

In one embodiment, the processing system 110 is provided for an input device having a plurality of sensor electrodes, where the processing system comprises a sensor module, a determination module, and a control module. The sensor module comprises sensor circuitry configured to operate the plurality of capacitive sensor electrodes to generate images of sensor values indicative of objects in a sensing region, where each of the images of sensor values is generated over a corresponding first period, with a second period between each first period. The determination module is configured to determine positional information using the images of sensor values and report the positional information to a host at a reporting interval and rate determined by a third period, where the third period is defined to include at least the sum of the first period and the second period. The control module is configured to facilitate setting of the second period to determine the reporting interval. By facilitating the setting of the second period, the control module enables independent determination of the reporting interval and thus facilitates the use of an image generating interval set to reduce errors caused by the motion of detected objects. This can provide improved accuracy of the input device 100, and thus can provide improved performance and usability of the input device 100.

Figure 2B:
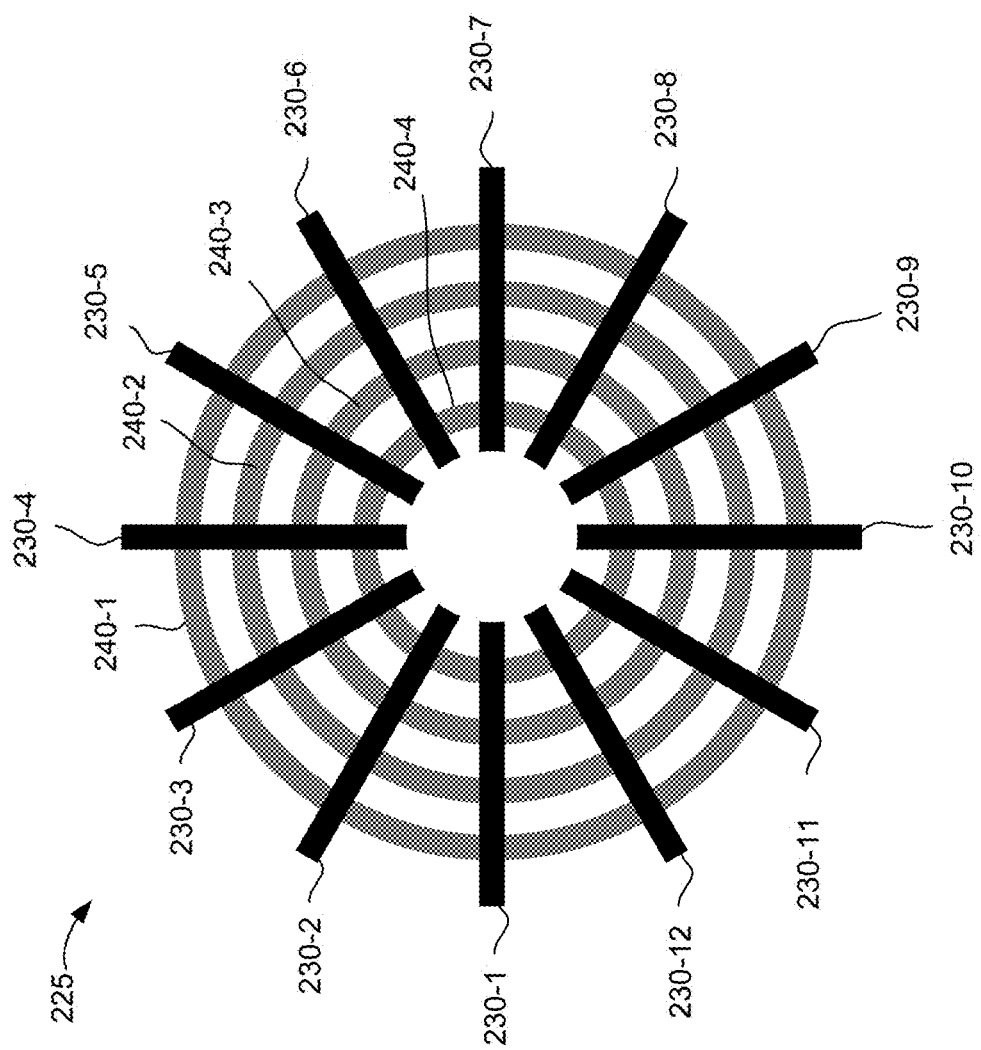

As was described above, the processing system 110 is coupled to sensor electrodes to determine user input. For example, by driving the sensor electrodes for absolute and/or transcapacitive sensing to detect one or more input objects in a sensing region. Turning now to FIG. 2, these figures conceptually illustrate exemplary sets of capacitive sensor electrodes configured to sense in a sensing region. Specifically, FIG. 2A shows electrodes 200 in a rectilinear arrangement, while FIG. 2B shows electrodes 225 in a radial/concentric arrangement. However, it will be appreciated that the invention is not so limited, and that a variety of electrode shapes and arrangements may be suitable in any particular embodiment.

Turning now to FIG. 2A, in the illustrated embodiment the capacitive sensor electrodes 200 comprise first sensor electrodes 210 and second sensor electrodes 220. Specifically, in the illustrated embodiment, the first sensor electrodes 210 comprise six electrodes 210-1 to 210-6, and the second sensor electrodes 220 comprise six electrodes 220-1 to 220-6. Each of the first sensor electrodes 210 is arranged to extend along a second axis. Specifically, each first sensor electrode 210 has a major axis that extends along the second axis. It should also be noted that the first sensor electrodes 210 are distributed in an array, with each of the first sensor electrodes 210 positioned a distance from adjacent first sensor electrodes 210 and corresponding to a different position in the first axis.

Likewise, each of the second sensor electrodes 220 is arranged to extend along a first axis, where the first and second axes are different axis. Specifically, each second sensor electrode 220 has a major axis that extends along the first axis. It should also be noted that the second sensor electrodes 220 are distributed in an array, with each of the second sensor electrodes 220 positioned a distance from adjacent second sensor electrodes 220 and corresponding to a different position in the second axis.

Sensor electrodes 210 and 220 are typically ohmically isolated from each other. That is, one or more insulators separate sensor electrodes 210 and 220 and prevent them from electrically shorting to each other. In some embodiments, sensor electrodes 210 and 220 are separated by insulative material disposed between them at cross-over areas; in such constructions, the sensor electrodes 210 and/or sensor electrodes 220 may be formed with jumpers connecting different portions of the same electrode. In some embodiments, sensor electrodes 210 and 220 are separated by one or more layers of insulative material. In some other embodiments, sensor electrodes 210 and 220 are separated by one or more substrates; for example, they may be disposed on opposite sides of the same substrate, or on different substrates that are laminated together.

As noted above, the sensor electrodes, including the sensor electrodes 200 can be used for absolute and/or transcapacitive sensing to detect one or more input objects in a sensing region. In transcapacitive sensing, the sensor pattern is "scanned" to determine the capacitive couplings between transmitter and receiver electrodes. That is, the transmitter electrodes are driven to transmit transmitter signals and the receiver electrodes are used acquire the resulting signals. The resulting signals are then used to determine measurements of the capacitive couplings between electrodes, where each capacitive coupling between a transmitter electrode and a receiver electrode provides one "capacitive pixel". A two-dimensional array of measured values derived from the capacitive pixels form a "capacitive image" (also commonly referred to as a "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

A detailed example of generating images of sensor values will now be given with reference to FIG. 2A. In this detailed example sensor values are generated on a "column-by-column", with the first resulting signals for each column captured substantially simultaneously. Specifically, each column of resulting signals is captured at a different time, and taken together are used to generate the first image of sensor values. In the embodiment of FIG. 2A, a transmitter signal may be transmitted with electrode 210-1, and first resulting signals captured with each of the receiver electrodes 220-1 to 220-6, where each first resulting signal comprises effects of the first transmitter signal. These six first resulting signals comprise a set (corresponding to a column) of first resulting signals that may be used to generate the first image of sensor values. Specifically, from each of these six first resulting signals provides a capacitive measurement that corresponds to a pixel in the first capacitive image, and together the six pixels make up a column in the first capacitive image.

Another transmitter signal may then be transmitted with electrode 210-2, and again first resulting signals may then be captured with each of the receiver electrodes 220-1 to 220-6. This comprises another column of first resulting signals that may be used to generate the first image. This process may be continued, transmitting from electrodes 210-3, 210-4, 210-5 and 210-6, with each transmission generating another column of first resulting signals until the complete first image of sensor values is generated.

It should next be noted that this is only one example of how such a capacitive image of sensor values can be generated. For example, such images could instead be generated on a "row-by row" basis using electrodes 220 as transmitter electrodes and electrodes 210 as receiver electrodes. In any case the images of sensor values can be generated and used to determine positional information for objects in the sensing region.

Next should be noted that in some embodiments the sensor electrodes 210 and 220 are both configured to be selectively operated as receiver electrodes and transmitter electrodes, and may also be selectively operated for absolute capacitive sensing. Thus, the sensor electrodes 210 may be operated as transmitter electrodes while the sensor electrodes 220 are operated as receiver electrodes to generate the image of sensor values. Likewise, the sensor electrodes 220 may be operated as transmitter electrodes while the sensor electrodes 210 are operated as receiver electrodes to generate images to generate the image sensor values.

As described above, sensor electrodes 210 and 220 may also be used for absolute capacitive sensing. In absolute capacitive sensing, the sensor electrodes 210 and/or 220 are modulated to determine the capacitive couplings between the sensor electrodes and any proximate conductive objects. That is, electrodes are modulated to generate resulting signals. Notably, and in contrast with transcapacitive sensing, in absolute capacitive sensing each resulting signal is received on the same electrode that was modulated to generate that resulting signal.

It should next be noted again that while the embodiment illustrated in FIG. 2A shows sensor electrodes arranged in a rectilinear grid, that is this is just one example arrangement of the electrodes. In another example, the electrodes may be arranged to facilitate position information determination in polar coordinates (e.g., r, Θ). Turning now to FIG. 2B, capacitive sensor electrodes 225 in a radial/concentric arrangement are illustrated. Such electrodes are examples of the type that can be used to determine position information in polar coordinates.

In the illustrated embodiment, the first sensor electrodes 230 comprise 12 electrodes 230-1 to 230-12 that are arranged radially, with each of the first sensor electrodes 230 starting near a center point and extending in different radial directions outward. In the illustrated embodiment the second sensor electrodes 240 comprise four electrodes 240-1 to 240-4 that are arranged in concentric circles arranged around the same center point, with each second sensor electrode 240 spaced at different radial distances from the center point. So configured, the first sensor electrodes 230 and second sensor electrodes 240 can be used to generate images of sensor values.

As described above, generating image of sensor values is relatively processing intensive. For example, using transcapacitive sensing to scan the capacitive couplings either on a "row-by-row" or "column-by-column" basis generally requires significant time and processing capability because each row and/or column in the image is generated separately. Furthermore, the rate at which each row or column can be scanned may be further limited by the relatively large RC time constants in some input device sensor electrodes. Furthermore, in typical applications multiple capacitive images are acquired over multiple time periods, and differences between them used to derive information about input in the sensing region. For all these reasons, the interval over which images of sensor values can be generated may be limited.

As was described above, because of the time required to generate each capacitive image, image sensors can be sensitive to errors caused by quickly moving objects. For example, some technologies used to create capacitive images can be sensitive to errors caused by quickly moving input objects. For example, "blurring" and/or "fragmenting" errors may be generated in systems that use some advanced signal processing techniques for generating capacitive images. For example, blurring may occur in systems that use simultaneous transmission of pluralities of transmitter signals. In such devices multiple transmitter signals are transmitted simultaneously and multiple resulting signals are likewise received simultaneously. The resulting signals are then deconvolved to produce multiple output signals, from which multiple capacitive values may be determined. In such devices each of these capacitive values corresponds to a pixel in the capacitive image, and thus multiple pixels may be determined simultaneously. Such simultaneous transmission techniques can thus reduce the time needed to form the entire capacitive image and/or increase the signal to noise ratio of the sensing device, and thus may be used to improve the performance of the device.

A variety of different techniques can be used to facilitate such simultaneous transmission of multiple transmitter signals. For example, the multiple transmitter signals can be modulated with multiple orthogonal mixing codes, using techniques such as code division multiplication. As another example, multiple transmitter signals can be facilitated using upper and lower sidebands, and/or signals in quadrature with each other. These various embodiments will be described in greater detail down below.

As noted above, in such embodiments multiple pixels may be determined simultaneously, and this can reduce the time needed to generate the entire capacitive image. However, it has been determined that such techniques may be particularly susceptible to certain types of errors. Specifically, it has been determined that in certain types of techniques that use code division multiplexing to facilitate simultaneous transmission that having a relatively shorter image generation interval is desirable to reduce the probability of fragmentation errors. However, such a short image generation interval may not be possible in cases where the image generation interval is the same as the reporting interval and the host device requires a slower reporting rate and hence a longer reporting interval.

Turning now to FIG. 3, an example of input object motion in a sensing region. Specifically, FIG. 3 illustrates a top view of an exemplary input device 300. In the illustrated example, user's finger 302 provides input to the device 300. Specifically, the input device 300 is configured to determine the position of the finger 302 and other input objects within the sensing region 306 using a sensor. For example, using a plurality of electrodes (e.g., electrodes 210 and 220 of FIG. 2A) configured to capacitively detect objects such as the finger 302, and a processor configured to determine the position of the fingers from the capacitive detection.

In the example of FIG. 3, the input device 300 is illustrated with an input object motion scenario. Specifically, an input object (i.e., a finger 302) is illustrated moving across the sensing region 306 from a first position to a second position. During such object motion the input device 300 capacitively detects images of sensor values and uses such images determine the position of the input object(s) at the times corresponding to these images.

Turning now to FIGS. 4 and 5 and examples of the capacitive detection of objects in such images of sensor values are illustrated. Specifically, FIG. 4A-4C shows examples of an accurate determination of positional information for the input object scenario illustrated in FIG. 3. In this example, the finger 302 is illustrated has having been detected in consecutive images at locations 402, 404 and 406 as it moved across the sensing region 306 from the first position to the second position. Although it should be noted this is just a simplified example, it can be seen that an accurate determination of position information can be determined from the images of sensor values as the finger 302 moves across the sensing region.

Figure 5A:
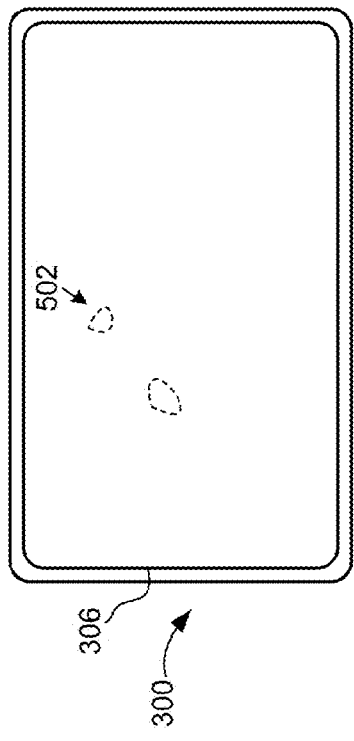
Figure 5B:
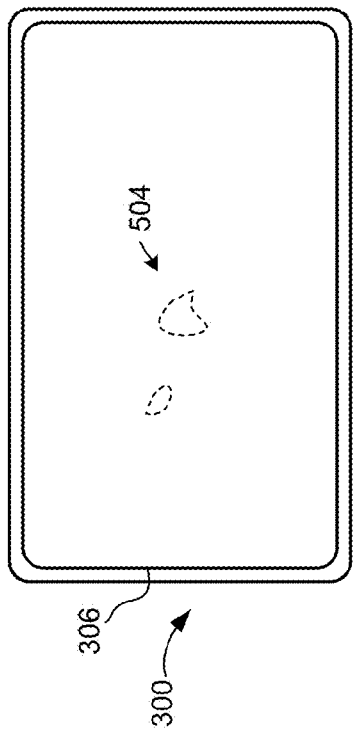
Figure 5C:
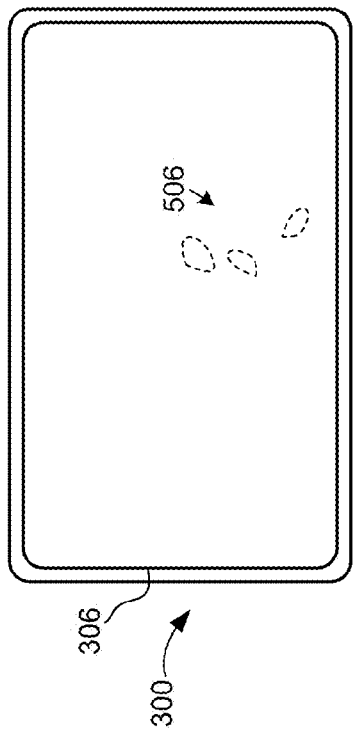

Turning now to FIG. 5A-5C, the effects of fragmentation errors are illustrated. In this example, instead of detecting the accurate positions of the fingers in the images of the sensor values the positional information is corrupted with errors. The locations of object detection 502, 504 and 506 are fragmented, making accurate determination of finger position difficult or impossible. Again, such fragmentation is the type of error that may be generated using some simultaneous transmission techniques when the image generating interval is too long. Thus, to reduce the probability of the scenario illustrated in FIG. 5, it is desirable to generate images of sensor values at an interval that is shorter than such a level. However, such a relatively short image generation interval may not be possible in cases where the image generation interval is the same as the reporting interval and the host device requires a slower reporting rate.

The embodiments described herein facilitate improved resistance to fragmentation errors in devices that use simultaneous transmission techniques by decoupling the image generating interval from the reporting interval. Specifically, the embodiments described herein enable the determination of the reporting interval independently of the period over which images of sensor values are generated. This can be accomplished by facilitating the setting of a second period, where images of sensor values are generated over a first period and the reporting interval is determined to include at least the sum of the first period and the second period. By enabling independent determination of the reporting interval and rate the embodiments described herein facilitate the use of an image generating interval set to reduce errors caused by the motion of detected objects. This can provide improved accuracy of the input device, and thus can provide improved performance and usability of the input device.

Figure 6:
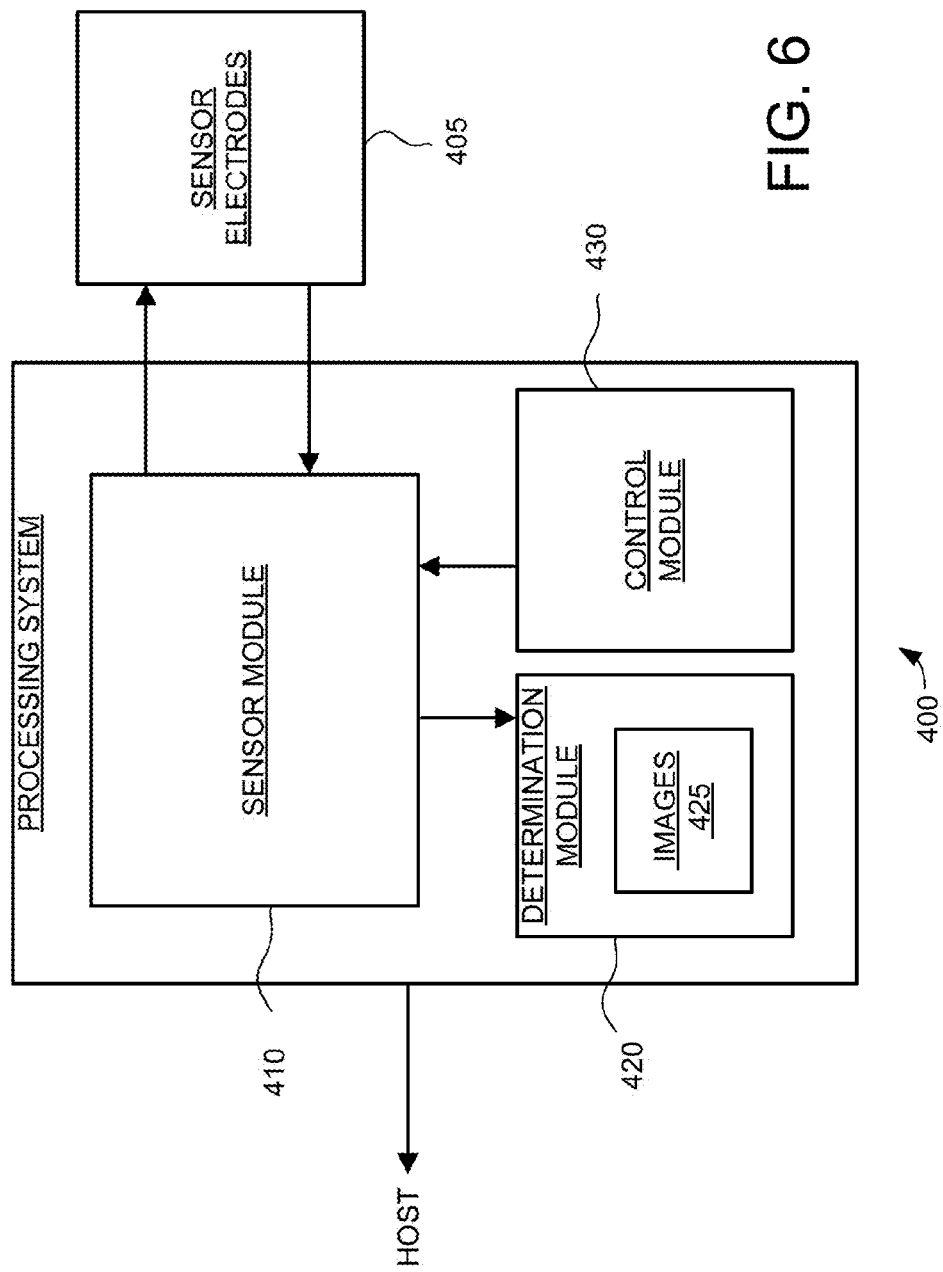
FIG. 6 is a schematic view of a processing system in accordance with an embodiment of the invention.

Referring now to the conceptual block diagram depicted in FIG. 6, one embodiment of an exemplary processing system 110 as shown in FIG. 1 may include a system 400. System 400, as illustrated, generally includes sensor module 410 communicatively coupled via a set of sensor electrodes (or simply "electrodes") 405, to determination module 420 and a control module 430. In one specific embodiment, for example, the sensor electrodes 405 are implemented as described above in connection with FIG. 2A or 2B.

Sensor module 410 may include any combination of hardware and/or software configured to operate the sensor electrodes. For example, by selectively transmitting signals with some portion of the electrodes 405 and selectively receiving resulting signals with some portion of the electrodes 405. This can include simultaneously transmitting a plurality of transmitter signals with a first set of the plurality of electrodes 405 and simultaneously receiving a plurality of resulting signals with a second set of the electrodes 405, wherein each of the resulting signals comprises effects corresponding to at least one of the plurality of simultaneously transmitted transmitter signals. In these embodiments the sensor module 410 may be determined to provide the transmitter signals in a variety of formats. For example, using techniques that facilitate transmission from multiple electrodes simultaneously. Such techniques may include the use of different codes, sidebands, and phases, or in different combinations thereof. Furthermore, the transmitter signals may comprise any one of a sinusoidal waveform, square waveform, triangular waveform, sawtooth waveform or the like.

As one specific example, the sensor module 410 may be configured to simultaneously transmit a plurality of distinct transmitter signals using a plurality of electrodes to generate resulting signals on other electrodes, where each of the simultaneously transmitted plurality of distinct transmitter signals is substantially mathematically independent of the other. As used herein, substantially "mathematically independent" refers to transmitter signals that can provide meaningful independent results, such as signals with zero or low cross-correlation. It should be noted that the transmitter signals can considered substantially mathematically independent even if the cross-correlation between signals is not strictly zero, as long as the signals can provide meaningful independent results.

Thus, in one embodiment, the mathematically independent transmitter signals are orthogonal to each other. In other embodiments, the mathematically independent transmitter signals are substantially orthogonal to each other. As one specific example, the transmitter signals can be based on one of a plurality of distinct digital codes. In such an embodiment the distinct digital codes can comprise substantially orthogonal codes, such as the type of digital codes used in code division multiple access (CDMA). As an example, the digital codes can comprise pseudo-random sequence codes. In other embodiments, Walsh-Hadamard codes, m sequence codes, Gold codes, Kasami codes, Barker codes, or other appropriate quasi orthogonal or orthogonal codes can be used.

In other embodiments the signals can be mathematically independent in phase, as may be implemented in phase modulation (PM) systems. In other embodiments the signals can be mathematically independent in frequency. Examples include various frequency modulation (FM) schemes, such as orthogonal frequency-division-multiplexing (OFDM).

In the illustrated embodiment, determination module 420 includes any combination of hardware and/or software configured to receive the resulting signals from sensor module 410 and generate images of sensor values (e.g., image 425). As described above, these resulting signals can have a variety of formats, and as such the determination module 420 may be configured to deconvolve, demodulate or otherwise process the resulting signals to determine the images of sensor values.

As one specific example, where the sensor module 410 simultaneously transmits a plurality of distinct transmitter signals using a plurality of electrodes to generate resulting signals on other electrodes, where each of the simultaneously transmitted plurality of distinct transmitter signals is substantially mathematically independent of the other, the determination module 420 may be configured to receive the resulting signals and deconvolve those resulting signals into distinct output signals. For example, the determination module may be configured to deconvolve the resulting signals in a plurality of deconvolved resulting signals, where each of the deconvolved resulting signals corresponds to one of the mathematically independent transmitter signals. Again, variety of techniques can be used to deconvolve the resulting signals. For example, a deconvolution matrix can be used. As other examples, the resulting signals can be deconvolved through demodulation, or through the use the plurality of distinct digital codes and/or one or more mixers. In each of these examples a plurality of resulting signals are generated that include the capacitive effects corresponding to a corresponding one of the mathematically independent transmitter signals.

It should be noted that the image generating interval is determined by the interval at which the sensor electrodes can be operated and the received values processed to determine the images of the sensor values. As such, in a transcapacitive embodiment the image generating interval is determined at least in part by the time needed to transmit transmitter signals and receive resulting signals for each of the pixels in the image. Again, as described above this can be done on a row-by-row or column-by-column basis, and can also be done with one or more transmitter electrodes transmitting simultaneously.

In being configured to generate the images of sensor values, the sensor module 410 and/or determination module 420 are configured to operate the plurality of capacitive sensor electrodes to generate images of sensor values 425 indicative of objects in a sensing region, where each of the images of sensor values 425 is generated over a corresponding first period, with a second period between each first period. The determination module 410 is also configured to determine positional information using the images of sensor values 425 and report the positional information to a host at a reporting rate determined by a third period, where the third period is defined to include at least the sum of the first period and the second period.

In reporting the positional information to the host at a reporting rate, the processing system 400 may report the position information using any suitable technique. For example, using any transmission protocol. As another example, using any transmission suitable hardware. As detailed examples, the processing system 400 may communicate with the host using any one or more of the following: buses, networks, and other wired or wireless interconnections. Examples include System Management Bus (SMBus), I²C, SPI, PS/2, Universal Serial Bus (USB), Bluetooth, RF, and IRDA.

It should be noted that the reporting rate is determined by the rate at which positional information is transmitted to the host. For example, the interval (and hence rate) at which images of sensor values are transmitted to the host. Such images of sensor values can comprise raw image data reported to the host, or a variety of other values derived from the raw image data.

In many cases the interval at which such images of sensor values are reported is a requirement determined by the host. As described above, the embodiments described herein allow that reporting interval and rate to be determined independently of the image generating interval.

The control module 410 is configured to facilitate setting of the second period to determine the reporting interval and rate. By facilitating the setting of the second period, the control module 410 enables independent determination of the reporting interval and rate and thus facilitates the use of an image generating interval set to reduce errors caused by the motion of detected objects. This can provide improved accuracy of the input device, and thus can provide improved performance and usability of the input device. Control module 410 may include any combination of hardware and/or software configured to facilitate setting of the second period to determine the reporting interval and allow independent control of the image generating interval and reporting rate. For example, the control module 410 may be configured to facilitate setting of the second period by being configured to allow the host to set the reporting interval and/or image generating interval. In one variation, the host can set the second period dynamically, such that reporting interval and/or image generating interval may be changed during operation of the input device. In other embodiments the control module 410 may be configured to allow the second period and the reporting interval and rate to be set during device set up, for example through the use of a configuration utility. In other embodiments, the control module 410 may be configured to facilitate setting of the second period and the reporting interval and rate during manufacture. For example, by allowing the second period and the reporting interval to be set via a firmware change or update.

Each of these various embodiments can be implemented using a variety of mechanisms. For example, various hardware and/or software registers can be used to set the second period. Again, such hardware and/or software registers can be used to set the second period at various times and using various tools. For example, using various tuning knobs made available on the host and/or configuration utility.

Turning now to FIG. 7, an example timing diagram 800 is illustrated. Specifically, the timing diagram 800 shows an operation where the first period (corresponding to the image generating rate) and the third period (corresponding to the reporting rate) are identical. In this example, the first period and the third period are the same, as would occur in a device where the image generating interval was tied to the reporting rate, or stated another way, where the second period is zero. Finally, it should be noted that while FIG. 7 shows the first period and the third period as being in phase, that this is a simplification for illustration purposes. Specifically, in most cases the reporting of image data will occur a time after the generation of the image, and thus the first periods and the third periods would not be in phase during operation.

Turning now to FIG. 8, a second example timing diagram 900 is illustrated. The timing diagram 900 shows an operation where the first period (corresponding to the image generating rate) and the third period (corresponding to the reporting rate) are different. In this example, a controllable second period is added such that the third period is defined to include at least the sum first period and the second period. As described above, by facilitating the setting of the second period the embodiments described herein facilitate independent determination of the reporting interval and thus facilitate the use of an image generating interval set to reduce errors caused by the motion of detected objects. This can provide improved accuracy of the input device, and thus can provide improved performance and usability of the input device. Again, it should be noted that while FIG. 8 shows the first period and the third period as being in phase, that this is a simplification for illustration purposes. Specifically, in most cases the reporting of image data will occur a time after the generation of the image, and thus the first periods and the third periods would not be in phase during operation.

Turning now to FIG. 9, a third example timing diagram 1000 is illustrated. The timing diagram 1000 shows a second operation where the first period (corresponding to the image generating rate) and the third period (corresponding to the reporting rate) are different. Like the second example, a controllable second period is added, where the third period is defined to include at least the sum first period and the second period. Again, by allowing the second period to be set, the embodiments described herein facilitates independent determination of the reporting interval and the image determination interval, and thus facilitate the use of an image generating interval set to reduce errors caused by the motion of detected objects and a reporting interval and rate that meets the needs of the host device. In this example the second period has been increased, thus facilitating the relative decrease of the first period compared to the third period, and thus facilitating a decreased image generating interval compared to the reporting interval.

Turning now to FIG. 10, a fourth example timing diagram 1100 is illustrated. The timing diagram 1100 shows a second operation where the first period (corresponding to the image generating interval) and the third period (corresponding to the reporting interval and rate) are different. Like the second example, a controllable second period is added, where the third period is defined to include at least the sum first period and the second period. Again, this facilitates the use of an image generating interval set to reduce errors caused by the motion of detected objects and a reporting interval that meets the needs of the host device. In this example the second period is actually greater than the first period. As will be described below, providing a relative large second period can facilitate a wide variety of different actions being performed during those time periods.

Turning now to FIG. 11, a fifth example timing diagram 1200 is illustrated. The timing diagram 1100 shows a second operation where the first period (corresponding to the image generating rate) and the third period (corresponding to the reporting rate) are different. Like the second example, a controllable second period is added, where the third period is defined to include at least the sum first period and the second period. This example shows explicitly that the first period and second period do not need to be in phase with the third period. Specifically, FIG. 11 shows an example where the reporting of positional information to the host would occur sometime after the generating of the image data. However, the interval and rate of the reporting is still determined by at least the sum of the first period and the second period.

In addition to providing the ability to independently determine the image generating interval and the reporting rate, the embodiments described herein can provide the additional ability to perform other actions during the second period and between image generations. As one example, the input device can enter into a lower power mode or otherwise change operation to save power during the second period. As a second example, other input and/or output devices can be activated during the second period. For example, input devices such as force sensors, and output devices such as LED lights or haptic feedback devices.

As another example, other capacitive sensor electrodes can be operated to determine additional positional information for objects in a second sensing region. This can be used to facilitate buttons or other such devices. It can also be used to facilitate capacitive force sensors that use such electrodes.

As another example, the input device can be configured determine interference during the second period. In this case interference can be determined by measuring the received signals that occur when no transmission or driving is occurring. In these cases it may be desirable to have a relatively large second period, such as at least 0.5 the time of the first period.

As another specific example, where the second period is large enough a second full image can be generated during the second period. This is generally possible where the second period is at least as long as the first period. This second full image can be used for a variety of purposes, including for determining baselines, averaging to reduce the effects of interference, etc. Additionally, this second image can be used to determine other positional information, including instantaneous velocities that may be reported with each reporting. As another example, different types of transmitter signals can be used to generate the first and second images, and the system configured to select the image having the lowest levels of interference.

As a second specific example, the second period can be used to determine position information using an alternative capacitive sensing method. For example, by using an absolute capacitive sensing technique to determine position information for objects that are farther away from the surface than could be accurately detected using transcapacitive sensing techniques that are commonly used to generate images of sensor values. Again, in absolute capacitive sensing, the sensor electrodes are modulated to determine the capacitive couplings between the sensor electrodes and any proximate conductive objects. That is, electrodes are modulated to generate resulting signals. Notably, and in contrast with transcapacitive sensing, in absolute capacitive sensing each resulting signal is received on the same electrode that was modulated to generate that resulting signal.

In one specific embodiment an input device is provided that includes plurality of transmitter electrodes proximate to the input surface, a plurality of receiver electrodes proximate to the input surface; and a processing system operatively coupled to the plurality of transmitter electrodes and to the plurality of receiver electrodes. In this embodiment the processing system is configured to simultaneously transmit a plurality of transmitter signals with a plurality of transmitter electrodes, simultaneously receive a plurality of resulting signals with a plurality of receiver electrodes in the plurality of receiver electrodes, wherein each of the resulting signals comprises effects corresponding to at least one of the plurality of simultaneously transmitted transmitter signals. The processing system is further configured to generate images of sensor values indicative of objects in a sensing region proximate to the input surface using the plurality of resulting signals, each of the images of sensor values generated over a corresponding first period with a second period between each first period. The processing system is further configured to determine positional information using the images of sensor values, report the positional information to a host at a reporting rate determined by a third period, the third period defined to include at least the sum of the first period and the second period, facilitate selection of the first period and the second period by the host to provide independent control of the first period and the reporting rate to the host.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for an input device, the processing system comprising:
a sensor module comprising sensor circuitry configured to:
operate a plurality of capacitive sensor electrodes to generate images of sensor values indicative of objects in a sensing region of the input device, each of the images of sensor values generated during a first period within a reporting interval,
wherein the reporting interval is a time period between each two adjacent reporting periods, wherein each reporting period is a time period for when information is periodically transmitted at a reporting rate from the processing system to an electronic device coupled to the processing system, and
receive data of auxiliary functionality during a second period within the reporting interval,
wherein the second period successively follows, within the reporting interval, the first period;
a determination module configured to:
determine positional information using the images of sensor values,
perform an action to provide said data of auxiliary functionality during the second period, the action selected from the group consisting of: receiving a signal indicative of interference in the input device; putting the processing system into a lower power mode; activating an input/output device; operating at least one additional capacitive sensor electrode to generate positional information for objects in a second sensing region of the input device; and receiving a signal using an alternative capacitive sensing method,
determine sensing information based on the data that is received during the second period, and
transmit, at the reporting rate that is determined by the reporting interval, the positional information and the sensing information as said periodically transmitted information to the electronic device, the reporting interval defined to include at least the sum of the first period and the second period; and
a control module configured to:
facilitate dynamically setting of the second period to determine the reporting rate.

2. The processing system of claim 1 wherein the control module is configured to facilitate setting of the second period by facilitating setting of the second period by the electronic device.

3. The processing system of claim 1 wherein the control module is configured to facilitate setting of the second period by facilitating setting a register that determines at least in part the second period.

4. The processing system of claim 1 wherein the sensor module is configured to operate the plurality of capacitive sensor electrodes to generate images of sensor values indicative of objects in the sensing region by:
simultaneously transmitting a plurality of transmitter signals with a first set of the plurality of capacitive sensor electrodes; and
simultaneously receiving a plurality of resulting signals with a second set of the plurality of capacitive sensor electrodes, wherein each of the resulting signals comprises effects corresponding to at least one of the plurality of simultaneously transmitted transmitter signals.

5. The processing system of claim 1 wherein the second period is at least 0.5 the first period.

6. An input device comprising:
a plurality of capacitive sensor electrodes;
a processing system operatively coupled to the plurality of capacitive sensor electrodes, the processing system configured to:
operate the plurality of capacitive sensor electrodes to generate images of sensor values indicative of objects in a sensing region proximate to an input surface of the input device, each of the images of sensor values generated during a first period within a reporting interval, wherein the reporting interval is a time period between each two adjacent reporting periods, wherein each reporting period is a time period for when information is periodically transmitted at a reporting rate from the processing system to an electronic device coupled to the processing system;

perform an action during the second period, the action selected from the group consisting of: receiving a signal indicative of interference in the input device; putting the processing system into a lower power mode; activating an input/output device; operating at least one additional capacitive sensor electrode to generate positional information for objects in a second sensing region; and receiving a signal using an alternative capacitive sensing method;

receive data of the performed-action result during a second period within the reporting interval, wherein the second period successively follows, within the reporting interval, the first period;

determine positional information using the images of sensor values;

determine sensing information based on the data that is received during the second period;

transmit, at the reporting rate that is determined by the reporting interval, the positional information and the sensing information as said periodically transmitted information to the electronic device, the reporting interval defined to include at least the sum of the first period and the second period; and facilitate dynamically setting of the second period to determine the reporting rate.

7. The input device of claim 6 wherein the processing system is configured to facilitate setting of the second period by facilitating setting of the second period by the electronic device.

8. The input device of claim 6 wherein the processing system is configured to operate the plurality of capacitive sensor electrodes to generate images of sensor values indicative of objects in the sensing region by:
simultaneously transmitting a plurality of transmitter signals with a first set of the plurality of capacitive sensor electrodes; and
simultaneously receiving a plurality of resulting signals with a second set of the plurality of capacitive sensor electrodes, wherein each of the resulting signals comprises effects corresponding to at least one of the plurality of simultaneously transmitted transmitter signals.

9. The input device of claim 6 wherein the second period is at least 0.5 the first period.

10. A method of determining input in an input device, the method comprising:
operating a plurality of capacitive sensor electrodes to generate images of sensor values indicative of objects in a sensing region of the input device, each of the images of sensor values generated during a first period within a reporting interval, wherein the reporting interval is a time period between each two adjacent reporting periods, wherein each reporting period is a time period for when information is periodically transmitted at a reporting rate from the processing system to an electronic device coupled to the processing system;
performing an action during the second period, the action selected from the group consisting of: receiving a signal indicative of interference in the input device; entering a lower power mode; activating an input/output device; operating at least one additional capacitive sensor electrode to generate positional information for objects in a second sensing region; and receiving a signal using an alternative capacitive sensing method;

receiving data of the performed-action result during a second period within the reporting interval, wherein the second period successively follows, within the reporting interval, the first period;

determining positional information using the images of sensor values;

determining sensing information based on the data that is received during the second period;

transmitting, at the reporting rate that is determined by the reporting interval, the positional information and the sensing information to the electronic device as said periodically transmitted information, the reporting interval defined to include at least the sum of the first period and the second period; and dynamically setting of the second period to determine the reporting rate.

11. The method of claim 10 wherein the setting of the second period comprises setting of the second period by the electronic device.

12. The method of claim 10 wherein the operating the plurality of capacitive sensor electrodes to generate images of sensor values indicative of objects in the sensing region comprises:
simultaneously transmitting a plurality of transmitter signals with a first set of the plurality of capacitive sensor electrodes; and
simultaneously receiving a plurality of resulting signals with a second set of the plurality of capacitive sensor electrodes, wherein each of the resulting signals comprises effects corresponding to at least one of the plurality of simultaneously transmitted transmitter signals.

13. An input device comprising: an input surface; a plurality of transmitter electrodes proximate to the input surface of an input device; a plurality of receiver electrodes proximate to the input surface of the input device; and a processing system operatively coupled to the plurality of transmitter electrodes and to the plurality of receiver electrodes, the processing system configured to: simultaneously transmit a plurality of transmitter signals with a plurality of transmitter electrodes; simultaneously receive a plurality of resulting signals with the plurality of receiver electrodes in the plurality of receiver electrodes, wherein each of the resulting signals comprises effects corresponding to at least one of the plurality of simultaneously transmitted transmitter signals; generate images of sensor values indicative of objects in a sensing region proximate to the input surface using the plurality of resulting signals, each of the images of sensor values generated during a first period within a reporting interval, wherein the reporting interval is a time period between each two adjacent reporting periods, wherein each reporting period is a time period for when information is periodically transmitted at a reporting rate from the processing system to an electronic device coupled to the processing system; perform an action during the second period, the action selected from the group consisting of: receiving a signal indicative of interference in the input device; putting the processing system into a lower power mode; activating an input/output device; operating at least one additional capacitive sensor electrode to generate positional information for objects in a second sensing region; and receiving a signal using an alternative capacitive sensing method;

receive data of the performed-action result during a second period within the reporting interval, wherein the second period successively follows, within the reporting interval, the first period; determine positional information using the images of sensor values; determine sensing information based on the data that is received during the second period; report transmit, at the reporting rate that is determined by the reporting interval, the positional information and the sensing information as said periodically transmitted information to the electronic device, the reporting interval defined to include at least the sum of the first period and the second period; and facilitate dynamically setting of the second period to determine the reporting rate.

\* \* \* \* \*